Patented Aug. 25, 1953

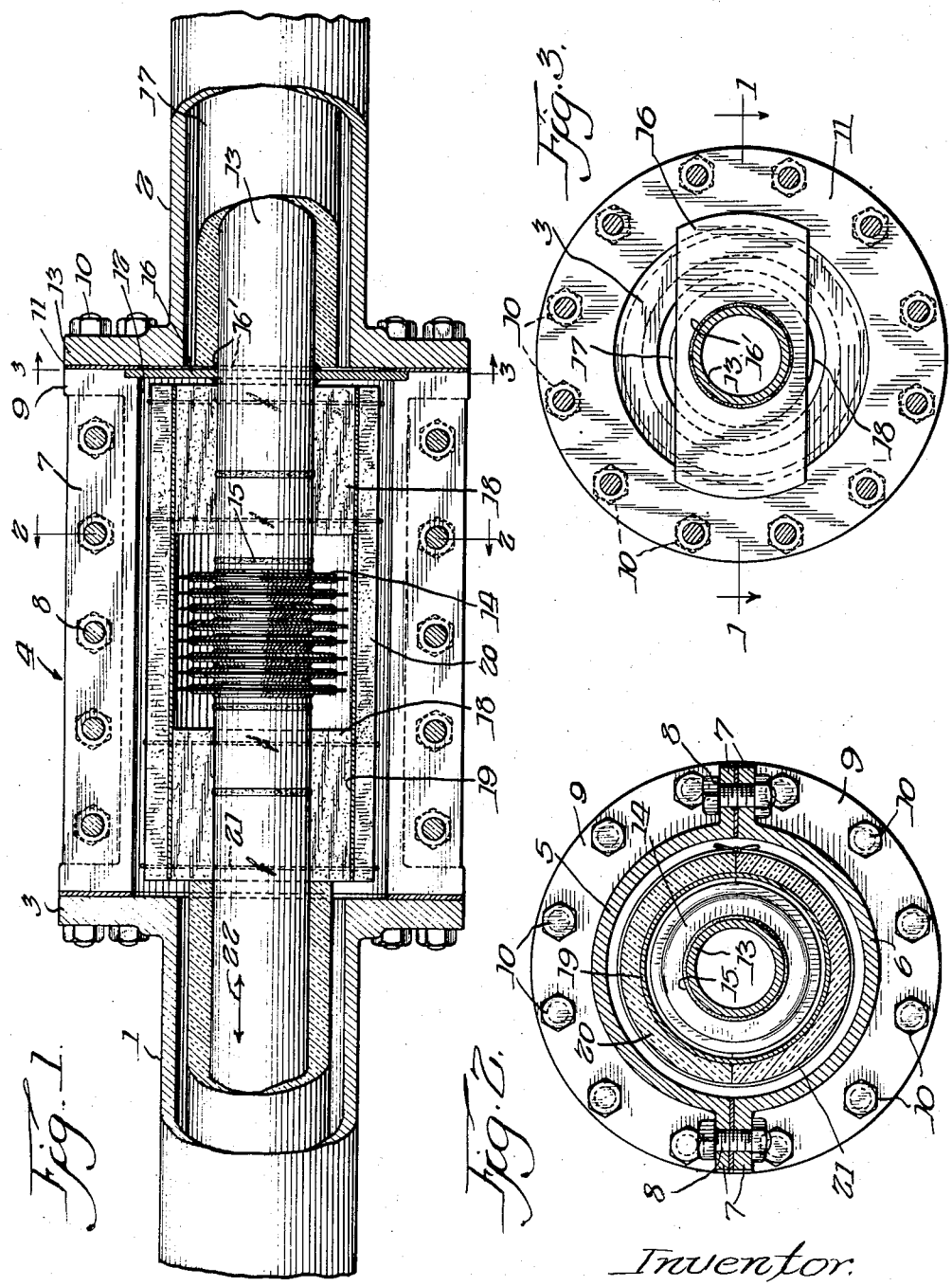

2,650,111

UNITED STATES PATENT OFFICE 2,650,111

EXPANSION JOINT ENCLOSURE

Edward W. Kaiser, Chicago, Ill.

Application October 29, 1948, Serial No. 57,225

2 Claims. (Cl. 285—22)

1

This invention relates to improvements in conduit systems of the housed or jacketed inner pipe line type, such as described and claimed in my co-pending applications for Letters Patent, Serial No. 511,366, filed November 22, 1943, and Serial No. 47,851, filed September 4, 1948, and particularly, to an expansion joint enclosure.

An object of the invention is to provide a durable, strong and operationally dependable expansion joint enclosure of the indicated character, installable in the housing or jacket line of a conduit system with a minimum of labor and time outlay, and in a minimum of space.

Another object of the invention is to provide an expansion joint enclosure whose installation and use in the housing or jacket line of a conduit system will permit the same to be laid between points of supply and delivery in the most direct path and will eliminate the presence of material consuming irregularities therein, such as hairpin, loop and similar expansion joints, heretofore used in such constructions.

It is also an object of the invention to provide an expansion joint enclosure so constructed as to house an inner pipe or pipe line installed expansion joint and provide about, over and along the same a longitudinal flow-way through which various matters can be effectually and satisfactorily conducted, said flow-way communicating with the conduit system flow-way between the housing or jacket line and the inner pipe line of such system.

Yet another object of the invention is to provide an expansion joint enclosure which can, if required, be installed in a housed or jacketed inner pipe line system following laying of the housings or jackets, and which will permit access to be had to its interior, as well as to devices enclosed therein, for various purposes, all without disruption of the laid and connected housings or jackets or the removal of material portions of the same.

A still further object of the invention is to provide an expansion joint enclosure device wherein an inner pipe installed expansion joint will be permitted to move freely and satisfactorily therein at and during all times of expansion and/or contraction of the inner pipe, as through temperature variations to which the same is or may be subjected, and so, compensate for variations in the length of the inner pipe during operation of the conduit system.

The invention also aims to provide an enclosure of the hereinbefore stated character, which will reduce heat or cold transmission from an inner pipe to a housing or jacket enclosing the same, to an absolute minimum without interference with expansion and/or contraction movement of the expansion joint.

The foregoing, as well as other objects, advantages and meritorious teachings of my invention,

2 will be in part obvious and in part pointed out in the following detailed disclosure thereof, when taken in conjunction with the accompanying drawings, it being understood that the form of the invention presented herein is precise and what is now considered to be the best mode of embodying its principles, but that modifications and changes may be made in specific embodiments without departing from its essential features.

In the drawings:

Figure 1 is a longitudinal section through my improved expansion joint enclosure, taken on the line 1—1 of Figure 3, looking in the direction in which the arrows point, showing the same in operative position between the ends of certain of the housings or jackets of a conduit system, the latter being fragmentally illustrated and partly in longitudinal section.

Figure 2 is a transverse section taken on the line 2—2 of Figure 1, looking in the direction in which the arrows point, and Figure 3 is a similar section taken on the line 3—3 of Figure 1, looking in the direction in which the arrows point.

Referring in detail to the drawings, the improved expansion joint enclosure is adapted to be arranged between and connected to the corresponding ends of co-axially disposed tubular bodies 1 and 2, such for example, as lengths of housings or jackets of a conduit system, made of cast iron or other material possessing adequate compression and tensile stress resistant properties, said housings or jackets being annularly flanged on their respective ends, as indicated at 3, the inner surfaces of which are preferably flat.

The enclosure consists of a tubular body, indicated in its entirety by the numeral 4, made of cast iron or other satisfactory material, medially and longitudinally divided throughout its length into relatively complementally opposed cross-sectionally semi-circularly shaped sections 5 and 6. Complemental outwardly disposed straight flanges 7 are integral with or otherwise fixedly mounted on the longitudinal sides of each of the housing or jacket sections 5 and 6. The opposite flanges are flushly engaged throughout their lengths and have spaced bolts 8 engaged transversely through the same. Thereby, the enclosure body sections 5 and 6 will be securely interconnected in that relationship shown in Figure 2, forming the aforesaid cross-sectionally circularly shaped expansion joint enclosure. Other outwardly disposed flanges 9 are integral with and arranged about the opposite ends of the sectional enclosure body 4 and have the adjacent ends of the flanges 7 joined thereto. When said sections 5 and 6 are in assembled relation (see Figure 2), the flanges 9 on the ends thereof will be contiguous and will permit coaxially aligned endwise connection of the enclosure body to adjacent flanges 3 of the housings or jackets 1 and 2, by engaging bolts 10 therethrough. For obvious reasons, gaskets 11 can be interposed between the engaged flanges 3 and 9.

It should be noted that the inside diameter of the enclosure body 4 is greater than that of the housings or jackets 1 and 2 endwise connected thereto, and accordingly, will provide an internal chamber for receiving or enclosing an expansion joint, hereinafter more fully described, whose inner peripheral surfaces will be disposed radially outwardly of, though substantially concentric to the inner peripheral surfaces of the housings or jackets 1 and 2.

Under certain conditions, it may be desired that the enclosure body 4 shall receive and house an inner pipe anchor plate. To permit this, one end of said body is provided with an annular internal seat by internally shouldering the adjacent ends of its sections 5 and 6, as at 12 (see Figure 1), the outer sides of which open outwardly onto the outer surfaces of their end connecting flanges 9.

An inner pipe or pipe line 13, made of cast iron, steel or other suitable material, is received in and disposed longitudinally of the coaxially interconnected housings or jackets 1 and 2 in substantially centrally supported relation thereto. A portion of this inner pipe is, of course, similarly received in and through the internal chamber of the enclosure body 4. An intermediate portion of the inner pipe within the enclosure body is removed and has a bellows type of expansion joint 14 mounted therein in spaced relation to the inner sides of said chamber, the opposite ends of the expansion joint being suitably connected, as at 15, to adjacent ends of the inner pipe. Thus, longitudinal expansion and/or contraction movement of the inner pipe, between certain and predetermined points, due to its subjection to varying temperatures, will be compensated for by means of said bellows expansion joint 14.

To prevent undesirable longitudinal movement or creeping of the inner pipe or pipe line 13 with relation to the expansion joint enclosure 4, for reasons which will be well understood in the art, said pipe or pipe line is anchored to the housing line, constituted by the housings or jackets 1 and 2, at predetermined distances throughout its length. If desired, and to effect such or certain of such anchorings, an internal anchor plate 16 is seated in the enclosure body annular seat 12 transversely of said body.

The anchor plate 16 comprises a flat, sheet-like body of iron, steel or other satisfactory material of appropriate gauge or thickness. It is of substantially rectangular formation having an intermediately located circularly shaped opening therein which rather snugly receives an adjacent portion of the inner pipe 13 therethrough (see Figure 3); said received adjacent portion of the inner pipe being fixedly connected to the anchor plate by welding 16', or other suitable means. The length of the anchor plate, at its longest point, is slightly less than the diameter of the internal annular seat 12, while its opposite ends are curved to conform to the degree of curvature of said seat. Hence, the anchor plate will be snugly received and seated in the seat. The width of the anchor plate 16 is less than the inside diameter of the internal chamber of the enclosure body 4; therefore, when positioned in the manner shown in Figure 3 of the drawings, its opposite sides will be spaced from opposite portions of the enclosure body chamber, providing ports or ways thereby to establish communication between the housings or jackets 1 and 2 and the enclosure body 4.

Because of the arrangement or disposition of the inner pipe 13 in and through the housings or jackets 1 and 2 and the enclosure body 4, plus the ported anchor plate 16, a continuous longitudinal flow-way is effected through the same. Various matters, either hot or cold, may and will be flowed through such continuous flow-way during operation of an embodying conduit system.

If desired, lengths of form sustaining insulating material constituting sleeves 17, can be arranged about and along the inner pipe 13, and particularly, those portions of said inner pipe received in and through the conduit system housings or jackets 1 and 2. Thus, heat exchange between adjacent portions of the inner pipe or pipe line 13 and the housings or jackets 1 and 2, will be reduced to minimum. It is to be noted, in this connection, that the outside diameters of the form sustaining insulating sleeves 17 are less than the inside diameters of the receiving housings or jackets 1 and 2. Consequently, the insulating sleeves 17 will be inwardly spaced with relation to the inner peripheral surfaces of the housings or jackets 1 and 2, and therefore, the aforesaid continuous flow-way therebetween will in no manner be disturbed or impeded throughout its length.

Where insulating sleeves 17, as above described, are arranged about those portions of the inner pipe or pipe line 13 received in and through the housings or jackets 1 and 2 of the conduit system, transversely split circular collars 18, made of form sustaining insulation, are engaged about portions of the inner pipe 13 within the chamber of the enclosure body 4 in relatively longitudinally spaced relation. The outside diameters of these enclosure received and relatively spaced longitudinally spaced split collars correspond. They are greater than those of the housing or jacket received insulating sleeves 17; also, they are greater than the diameters or other outside dimensions of the bellows expansion joint 14, as clearly shown in Figure 1 of the drawings. A cross-sectionally circularly shaped metal sleeve 19 is snugly and fixedly engaged over and about the outer peripheral surfaces of the longitudinally spaced split collars 18 and movably houses the expansion joint 14 therein between the split collars.

A medially and longitudinally divided sleeve 20, made of form sustaining insulation and corresponding in length to the metal sleeve 19, is snugly engaged over and about said metal sleeve. Bands, wires, or other ties, indicated by the numeral 21, are bindingly engaged transversely or circumferentially about the opposite end portions of the sectional insulating sleeve 20 and serve to interconnect its sections in assembled relation, and at the same time, bindingly interconnect the opposite end portions of said sleeve and those of the metal sleeve 19 with the split collars 18. Thus, a relatively fixed and permanent assembly of these parts is effected within the internal chamber of the enclosure body 4 in which the bellows expansion joint 14 is movably housed, i. e., housed in a manner to permit its unimpeded longitudinal expansion and/or contraction whereby to effectually compensate for similar movement of the inner pipe 13, as heretofore described.

The assembly of the insulating collars 18, the metal sleeve 19, and the longitudinally divided insulating sleeve 20, in addition to housing the bellows expansion joint 14, also functions to reduce to minimum the transmission of heat or cold between the inner pipe 13 and the enclosure body 4. Furthermore, because the outside diameter of the insulating sleeve 20 is less than the diameter of the internal chamber of the enclosure body, and moreover, is of less length than said chamber, it will be over-all spaced therefrom, and so, provide a longitudinal flow-way over and about the same, which way communicates at its opposite ends with the heretofore described flow-ways between the inner pipe 13 and the housings or jackets 1 and 2 receiving it therethrough, and unimpeded flow of various matters therethrough is ensured.

A conduit system embodying my invention, it will be understood, may have any number thereof installed in and throughout the housing or jacket line constituted by the housings or jackets 1 and 2, or their equivalents. Installations of the expansion joint enclosure are, of course, effected over and about the bellows expansion joints interposed in the inner pipe or pipe line 13 for the herein described reasons.

At those points where required, anchor plates 16 can be mounted or seated in the or certain of the enclosure bodies 4, as shown in Figure 1. Enclosure bodies so equipped will effect positive anchoring of adjacent and engaged portions of the inner pipe or pipe line 13, and will also permit longitudinal expansion and/or contraction movement of those extended portions of the pipe line 13, indicated by the arrow identified at 22.

By the same token, it will be understood that anchoring of the inner pipe or pipe line 13 to the housing or jacket line 1—2, can be additionally effected by and through the use of other anchors installed directly between the same, and not in the enclosures of my invention, as for example, in accordance with the disclosures of my aforesaid co-pending applications for Letters Patent, Serial Nos. 511,366 and 47,851, provided, of course, that expansion joints 14 enclosed by my joint enclosure, are installed whereby to compensate for longitudinal expansion and/or contraction movement of the inner pipe or pipe line 13.

Expansion joint enclosures of my invention, when installed in a housed or jacketed conduit system, will permit convenient and ready access to their interiors and to devices housed thereby, such access being effected by removing one of the interconnected sections 5—6 of the enclosure body 4. Inasmuch as the other of said body sections will remain connected to the housing or jacket line 1—2, said line will not be disturbed or disrupted. Furthermore, it will be understood and appreciated that anchor plates 16, seated in said expansion joint enclosures, will be entirely contained therewithin; hence, will neither require nor depend upon any connection whatsoever with any additional anchoring devices, beds, etc., arranged exteriorly of or beyond the conduit system housing or jacket line 1—2. The installing of my improved expansion joint enclosures in the housing or jacket line of a conduit system can be made with a minimum of labor and time outlay, and just as important, they will require no costly constructional changes to or modifications of the conduits or pipes of such system. They will also ensure unimpeded and satisfactory direct line communication between the inner pipe line and the housing or jacket line longitudinal flow-way without need for by-passing or other travel diverting arrangements or constructions.

I claim:

1. An expansion joint enclosure, comprising in combination with relatively spaced co-axially disposed housings, a pipe in and extending through said housings in spaced relation thereto and an expansion joint interposed in the pipe between the spaced housings, flanges on the adjacent ends of the housings, a tubular enclosure body between and in juxtaposed relation to the adjacent ends of the housings having its opposite ends connected to and partially closed by said flanges, said body receiving a portion of the pipe longitudinally therethrough and the expansion joint therein, form sustaining collars in the opposite end portions of the enclosure body having their inner ends relatively spaced from each other and adjacent ends of said expansion joint and their outer ends in proximity to said flanges, a form sustaining sleeve engaged snugly over and about said collars spanning the space between the inner ends thereof and housing the expansion joint, a second form sustaining sleeve snugly engaged about and along said first sleeve throughout its length spaced from the inner side walls of said enclosure body and having its ends in proximity to said flanges, and an anchor plate seated flushly in one end of said enclosure body and clampingly retained therein by engagement of the adjacent flange on the end of one of said housings.

2. An expansion joint enclosure, comprising in combination with relatively spaced co-axially disposed housings, a pipe in and extending through said housings in spaced relation thereto and an expansion joint interposed in the pipe between the spaced housings, flanges on the adjacent ends of the housings, a medially divided tubular enclosure body between and in juxtaposed relation to the adjacent ends of the housings having its opposite ends connected to and partially closed by said flanges, means interconnecting the medially divided portions of said enclosure body, said enclosure body receiving a portion of the pipe longitudinally therethrough and the expansion joint therein, form sustaining collars in the opposite end portions of the enclosure body having their inner ends relatively spaced from each other and from adjacent ends of said expansion joint and their outer ends in proximity to said flanges, and a form sustaining sleeve snugly engaged over and about said collars spanning the space between the inner ends thereof and housing the expansion joint therebetween, the outer side walls of said sleeve being spaced from the inner side walls of the enclosure body and its opposite ends being arranged in proximity to said flanges and said sleeve being medially divided longitudinally of itself, and means engaged about said sleeve securing the medially divided sections thereof about said form sustaining collars.

EDWARD W. KAISER.

References Cited in the file of this patent

UNITED STATES PATENTS

| Number | Name | Date |
|---|---|---|
| 1,079,836 | Canfield | Nov. 25, 1913 |
| 1,495,066 | Browne | May 20, 1924 |
| 2,341,164 | Shimek | Feb. 8, 1944 |
| 2,361,383 | Coffman | Oct. 31, 1944 |

FOREIGN PATENTS

| Number | Country | Date |
|---|---|---|
| 144,376 | Switzerland | Mar. 16, 1931 |